United States Patent

Vercesi et al.

[11] Patent Number: 5,830,395
[45] Date of Patent: Nov. 3, 1998

[54] PROCESS FOR MAKING A UNIFORM DISPERSION OF ARAMID FIBERS AND POLYMER

[75] Inventors: Giorgio P. Vercesi, Avully; Jean Pierre Jakob, Ballaison, both of Switzerland; Nicolas Cudre-Mauroux, Parkersburg, W. Va.

[73] Assignee: E. I. du Pont de Nemours and Company, Wilmington, Del.

[21] Appl. No.: 909,899

[22] Filed: Aug. 12, 1997

[51] Int. Cl.[6] ............................ B29C 47/38; B29C 47/76
[52] U.S. Cl. .................. 264/101; 264/171.1; 264/211; 264/211.21; 264/211.23; 264/349
[58] Field of Search ..................... 264/101, 171.1, 264/211, 211.21, 211.23, 349

[56] References Cited

U.S. PATENT DOCUMENTS

| | | |
|---|---|---|
| 2,999,788 | 9/1961 | Morgan . |
| 3,018,091 | 1/1962 | Duggins . |
| 4,927,579 | 5/1990 | Moore ................................... 264/101 |
| 5,028,372 | 7/1991 | Brierre et al. . |
| 5,205,972 | 4/1993 | Kafka . |
| 5,205,973 | 4/1993 | Kafka ................................... 264/101 |
| 5,439,623 | 8/1995 | Fintel . |
| 5,532,059 | 7/1996 | Lee . |

*Primary Examiner*—Leo B. Tentoni

[57] ABSTRACT

A process for making a substantially uniform composition of short aramid fibers and polymer wherein the fibers are provided with a significant moisture content to improve handling characteristics and are partially dried and opened by shear forces in an extruder before contact with the polymer in the extruder.

12 Claims, 1 Drawing Sheet

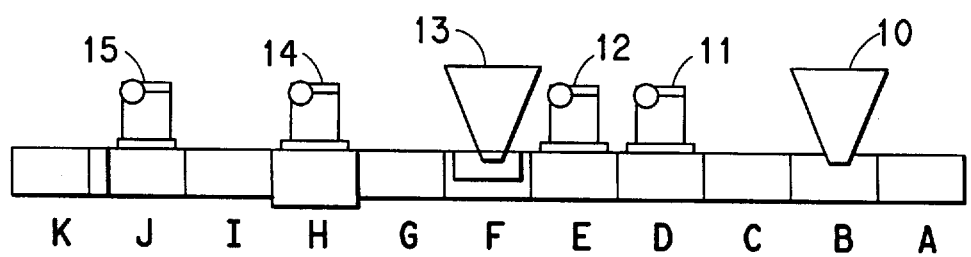
FIGURE

PROCESS FOR MAKING A UNIFORM DISPERSION OF ARAMID FIBERS AND POLYMER

BACKGROUND OF THE INVENTION

1. Field of the Invention

This invention relates to making uniform dispersions of aramid fibers in extrudable polymer on a continuous basis.

2. Description of the Prior Art

U.S. Pat. No. 5,439,623 discloses that introduction of additives to thermoplastic polymers by means of an extruder is difficult and that, even for pelletized additive concentrates, gravimetric or volumetric feeders are very difficult to control.

U.S. Pat. No. 5,205,972 discloses that fibers can be uniformly combined with polymer in an extruder by making a slurry of the fibers with a latex of the polymer, introducing the slurry into an extruder, and coagulating the latex and venting slurry water from the extruder.

SUMMARY OF THE INVENTION

This invention relates to a process for continuously combining short aramid fibers with extrudable polymer to yield a substantially uniform composition comprising 15 to 99 weight percent of the polymer and 1 to 85 weight percent of the aramid fibers comprising the steps of providing aramid fibers having a moisture content of 20 to 85 weight percent water based on the weight of the fibers; continuously introducing the moist aramid fibers at a substantially constant rate into an extruder; applying heat to the fibers in the extruder to evaporate water from the fibers; subjecting the heated fibers to shear forces in the extruder before introduction of the polymer; to open the fibers; continuously introducing the polymer into the extruder downstream from introduction of the fibers; mixing the polymer and the fibers in the extruder to yield a substantially uniform composition; and expelling the composition from the extruder.

BRIEF DESCRIPTION OF THE DRAWING

The figure is a schematic representation of an extruder which can be used in practice of this invention.

DETAILED DESCRIPTION

Elastomeric and thermoplastic polymeric materials are often reinforced using short fibers and, in cases where the special qualities of aramid materials are desired, aramid fibers are often used for the reinforcement. High temperature and high modulus requirements can often be met using short aramid fibers as reinforcement. Short aramid fibers are useful when uniformly distributed throughout an elastomeric or thermoplastic matrix material. Uniformity of distribution has been difficult to achieve in the past, however, due to the difficulty in continuously feeding short aramid fibers at a constant rate. This invention provides a continuous process for uniformly distributing short aramid fibers in polymeric material, wherein the short fibers are fed at a constant rate, thereby, improving the means for general use of short aramid fibers in high volume production of short aramid fiber reinforced polymeric compositions.

Short reinforcement fibers can be added directly to a matrix polymer for reinforcement purposes or they can be combined in higher concentration with a carrier polymer to make a masterbatch composition. The masterbatch composition can then be used as a source of fibers for reinforcement purposes. The carrier polymer can be the same as the ultimate matrix polymer or it can be compatible therewith. For purposes of this invention the carrier polymer is also called a matrix polymer.

Short aramid fibers in dry form, especially short aramid fibers which are highly fibrillated such as aramid pulp, tend to clump and agglomerate and bridge across transfer conduits in ways that make continuous, constant rate, feeding very difficult. As will be explained in detail hereafter, it has been discovered that moisture in the short fibers causes a dramatic change in the character of the fibers, permitting them to be easily handled and fed at a constant rate into and through extruders.

By "short aramid fibers" is meant aramid fibers or particulate materials of small diameter and high aspect ratio having a length of 0.1 to 8 mm, preferably 0.7 to 3 mm. The short fiber aspect ratio, which is the ratio of length to diameter, is from as little as 10 to as much as 1000 or perhaps slightly more.

While this invention may be effective for and can be used with short fibers of several kinds, it finds use primarily with fibrillated materials or materials with very high surface area and low bulk density. Such fibrillated materials or short aramid fibers include pulp and particularly aramid pulp which is made in accord with the teaching of U.S. Pat. Nos. 5,028,372 and 5,532,059 or by refining aramid floc with an original length of 0.1 to 8 mm. For purposes of this invention, short aramid fibers also includes particulate materials known as "fibrids" and particularly aramid fibrids made, for example, in accord with the teachings of U.S. Pat. Nos. 2,999,788 and 3,018,091; and substantially unfibrillated aramid fibers with a diameter of 5 to 15 micrometers and a length of 0.1 to 8 millimeters known as "floc".

The short aramid fibers can be coated, as by epoxy, phenolic, resorcinol-formaldehyde, polyurethane, silicone, plasticizer, or the like, or can be treated with agents which alter handling behavior, adhesion properties, static charge retention, and the like. The short aramid fibers can, also, be used in combination with other particulate materials such as carbon black, fluoropolymers, chitosan, colorants, fillers, antioxidants, and the like; and can be used with other fibers such as glass, mineral, carbon, natural (cotton, jute, ramie, and the like), synthetic (polyester, nylon, and the like), and the like. The kind, type, and concentration of additional material is not critical so long as there is no interference with the handling characteristics of the moist short aramid fibers.

By "aramid" is meant a polyamide wherein at least 85% of the amide (—CO—NH—) linkages are attached directly to two aromatic rings.

Additives can be used with the aramid and it has been found that up to as much as 10 percent, by weight, or even more of other polymeric material can be blended with the aramid or that copolymers can be used having as much as 10 percent of other diamine substituted for the diamine of the aramid or as much as 10 percent of other diacid chloride substituted for the diacid chloride or the aramid.

Para-aramids are the primary polymers in the short fibers of this invention and poly(p-phenylene terephthalamide) (PPD-T) is the preferred para-aramid. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride.

Meta-aramids are, also, important for use in the short fibers of this invention and poly(m-phenylene isophthalamide) (MPD-I) is the preferred meta-aramid. By MDP-I is meant the homopolymer resulting from mole-for-mole polymerization of m-phenylene diamine and isophthaloyl chloride and, also, copolymers resulting from incorporation of small amount of other diamines with the m-phenylene diamine and all of small amounts of other diacid chlorides with the isophthaloyl chloride.

Short aramid fibers which are dry or even which contain small amounts of moisture, such as 2 to 5 weight percent or, perhaps slightly more, as may be naturally occurring in some fibers, may exhibit a strong negative electrostatic charge and are fluffy and exhibit a low bulk density and, as a consequence, are difficult to handle and feed in a metered way at constant rate. As the moisture content of aramid fibers is increased, the electrostatic charges are diminished and the bulk density is increased resulting in an improvement in handling character. It has been discovered, as is identified herein as the invention, that short aramid fibers which are moist can be handled and metered without difficulty. The degree of moisture which is anticipated for use by this invention is from 20 to 85, preferably 30 to 70, weight percent based on the weight of the dry fiber. At those moisture concentrations, the handling characteristics of the fibers are changed, that is, for short aramid fibers having 50 weight percent water, the electrostatic charge on the fibers is substantially zero and the bulk density of the fibers is increased more than three-fold from 50 grams per liter to 170 grams per liter. At moisture concentrations of less than 20 weight percent, the fibers are difficult to handle due to the very low bulk density and the high electrostatic charge; and at moisture concentration of greater than 85 weight percent, the fibers clump together as a semi-solid mass and may even form a thick slurry. By "moisture" is usually meant water, but any volatile liquid or mixture of liquids which can wet the fibers could be used.

By stating that the moist fibers of this invention can be handled and metered without difficulty is meant that such moist fibers can be fed continuously at a constant rate using conventional feeding means such as single screw or double screw feeders, conical, inverse cone, loss-in-weight, or volumetric feeders, vibrating feeders, conveyor belt feeders, and the like. High surface area, dry, fibers cannot be fed at a constant rate using such feeders.

The polymeric material which is to be combined with the short fibers can be any polymer or combination of polymers which can be extruded through an extruder. Elastomers and thermoplastic polymers are generally embraced and include: polyolefins such as high and low density polyethylene, polypropylene; ethylene vinyl acetate copolymers; ethylene methyl acrylate copolymers; ionomer resins; polymethylmethacrylate; polyvinylchloride; EPDM rubbers; chloroprene; copolyester elastomers; polyethyleneterephthalate; polybutylene-terephthalate; liquid crystal polymers; polyetheretherketone; polyetherketoneketone; ABS; polyphenylsulphide; polyamides; polyimides; polyurethanes; silicones; and the like. The polymeric material must be liquid or at least softened at operating temperature in an extruder and can even be liquid at 20° C. or lower as may be the case with thermoset resins including phenolic, epoxy, polyester, and vinyl ester resins.

The composition made by this invention generally comprises 15 to 99 weight percent polymer and 1 to 85 weight percent short aramid fibers. The invention is used to blend short aramid fibers into matrix polymer for direct use; and, also, to make masterbatch compositions to be, themselves, blended with additional polymers at a later time. For direct use, the composition generally comprises 90 to 99 weight percent polymer material and 1 to 10 weight percent short aramid fibers; and for masterbatch use, the composition generally comprises 25 to 60 weight percent polymer and 40 to 75 weight percent short aramid fibers.

The process of this invention is performed using an extruder to accomplish mixing of the polymer and the moist short aramid fibers. The extruder can be of the single screw variety or can be a twin screw co- or counter-rotative device. The screw elements can be bilobal, trilobal, self-wiping, intermeshing or not, and the extruder can be made to include a variety of screw elements such as transport elements, kneading blocks, blisters, gears, reverses, and the like. The extruder must be fitted with elements which will permit continually introducing the polymer ahead of (downstream from) the moist short fibers and venting of steam from evaporation of moisture from the fibers.

The Figure depicts one extruder arrangement which can be used to practice the invention. Element-by-element, A is the back of the extruder, B is a section with port 10 for introducing the moist short aramid fibers, C is a heated section where the moist fibers are at least partially dried and opened, D and E are sections with vents 11 and 12 for releasing moisture evaporated from the fibers, F is a section with a port 13 for introducing the polymer downstream from port 10, G is a heated section where the polymeric material is melted or at least softened and additional moisture is evaporated, H, I, and J are sections with mixing elements to uniformly disperse the aramid fibers into the polymer, and K is the end section of the extruder and may be fitted with an extruder die or not, as desired. Elements H and J include vents 14 and 15 for release of evaporated moisture.

Element B is preferably fitted with screws having deep flights to ensure constant material take-up from port 10. The moist short aramid fiber material is introduced to port 10 in separated form or in chunk form of 1 to 5 centimeters, or thereabouts, which, due to the moisture present in the fibers, can be fed at a constant rate. Although not a preferred method, the moist short aramid fibers can be introduced into the port of the extruder as a continuous formed bar or "wet lap" of fibers having just enough moisture to cause the fibers to hold the shape of the wet lap.

The moist short aramid fibers, continuously introduced into the extruder, are conducted by the screws down the barrel of the extruder and heat is introduced to evaporate some of the moisture from the fibers. Screw elements in Element C are chosen to not only transport the moist short aramid fibers but, also, to work the fibers to assist in their drying and to partially open them by subjecting the fibers to shearing forces. By "opening" the fibers is meant that they are separated and disentangled from one another, thus, decreasing the bulk density. Acceptable inserts in Element C are those which will not only transport but will, also, apply shearing forces to the fiber mass, such as gears or kneading blocks or the like. Moisture evaporated in Element C and immediately beyond is released at vents 11 and 12. At element F, polymeric material is continuously introduced to port 13 where mixing of the fibers and the polymer is commenced. Heat is introduced to Element G to melt or soften the polymer and evaporate more of the moisture. Mixing is continued through the extruder and a substantially uniform composition is expelled from the extruder. Heat may be generated by the mixing action of the extruder and heat may be introduced from external sources; and the heat softens or melts the polymer, mixes the polymer and the fibers, and evaporates water from the mixture. The water is released from the extruder through vents.

When the polymer is subject to degradation by hydrolysis on contact with moisture, as from the moist fibers, the moisture should be completely evaporated from the fibers and vented from the extruder before the fibers reach the polymer. For example, by reference to the Figure, moisture from the short fibers would be removed entirely through vents 11 and 12 in elements D and E.

It is important to note that the polymer is introduced into the extruder downstream from the moist aramid fibers.

When the polymer is introduced into the extruder downstream from the moist aramid fibers, the mixing is easily accomplished and uniformity is readily obtained. Adequate mixing is not accomplished when the polymer is introduced into the extruder upstream from the moist fibers. In that event, the fibers cannot be opened before contact with the polymer. It has been found that when the polymer is fed upstream from the fibers, or at the same port, only partial fiber dispersion can be achieved in the composition. Uniform fiber dispersion is only achieved, as in this invention, when moist short aramid fibers are fed to the extruder and are partially dried and opened before mixing with the polymer.

DESCRIPTION OF THE PREFERRED EMBODIMENTS

EXAMPLE 1

In this example, a short aramid fiber material was continuously combined with polymer at a substantially constant rate to yield a composition made up of fiber uniformly distributed in the polymer.

The short aramid fibers were poly(p-phenylene terephthalamide) pulp with an average fiber length of 0.7 to 0.8 millimeter, a BET surface area of 8 to 9 meters$^2$/gram, and a Canadian Standard Freeness of about 215 milliliters. It was the product sold by E. I. du Pont de Nemours and Company under the tradename Kevlar®, merge 1F361, and was treated to contain about 50 weight percent water.

The polymer was an ethylene vinyl acetate copolymer having 40 weight percent vinyl acetate and a melt index of 57 dg/min. It was the product sold by E. I. du Pont de Nemours and Company under the tradename Elvax® 40W.

The mixing was performed in a 57 millimeter, Werner Pfleiderer twin screw corotative extruder having a port for introduction of the pulp and, downstream from that, a port for introduction of the polymer. The extruder had, as shown in the Figure, eleven sections with four vents and two feed ports, was 33 diameters in length and, for this example, was run at 350 rpm. The moist pulp was fed into port 10 at a rate of 22.7 kilograms per hour and the polymer was fed into port 13 at a rate of 10.4 kilograms per hour. Water vapor was released from the extruder at vents located in Sections D, E, H, and J. Heat to the various sections was set to achieve the following temperatures in operation:

| | Section | | | | | | | | | |
|---|---|---|---|---|---|---|---|---|---|---|
| | B | C | D | E | F | G | H | I | J | K |
| Temperature (°C.) | 245–252 | 119–195 | 119–124 | 71–80 | 49–58 | 86–91 | 42–55 | 79–83 | 89–99 | 88–91 |

The moist pulp was fed using a loss-in-weight feeder with a large mouth feeder and an open spiral single screw, as sold by KTron-Sauder (Switzerland) and the polymer, in pellet form, was fed using a low rate feeder with auger-style screws, also from Ktron-Sauder.

The combination of pulp and polymer which was expelled from section K of the extruder was found to be 51.5+0.5 weight percent pulp uniformly and consistently over the duration of the run. Tests showed that the pulp fiber length was not altered by the process. When pellets of the combination 35 were melted and pressed in a very thin sheet, visual inspection showed that there were no fiber aggregates.

It should be noted that the pulp could be fed at a constant rate because it included about 50 weight percent water. If the moisture content of the pulp had been less than 20 weight percent water, the texture of the pulp would have been such as to make it impossible to feed at a constant rate.

It should, also, be noted that the polymer was introduced into the extruder downstream from the pulp. When the polymer is introduced into the extruder upstream from the pulp, the fiber cannot be adequately opened to achieve uniform dispersion in the polymer.

EXAMPLE 2

In this example, the same short aramid fiber material with the same moisture level as was used in Example 1 was continuously combined, at a substantially constant rate, with a variety of polymers in a 40 millimeter, Berstorff corotative twin screw extruder having a port for introduction of the fibers and, downstream from that, a port for introduction of the polymer. The extruder had seven sections with two vents and two feed ports, and was 33 diameters in length.

The moist pulp was fed into the extruder using a Hasler 4021, loss-in-weight feeder fitted with pig tail style twin screws, and it was noted that any moisture level of less than about 20 weight percent would have resulted in fibers which were too fluffy or too highly charged with static electricity to feed using that device.

Temperatures in the extruder were adjusted to be high enough to soften the polymer at introduction but low enough to keep hot water vapor from clogging the port. The polymers, feed rates, and other information were as follows:

| Polymer | Polymer Feed Rate (kg/hr.) | Pulp Feed Rate (kg/hr.) | Extruder Speed (rpm) |
|---|---|---|---|
| ethylene/vinyl acetate[1] | 4.54 | 10.4 | 400 |
| ionomer[2] | 5.45 | 12.7 | 250 |
| EPDM[3] | 4.54 | 10.4 | 350 |

[1]Vinyl acetate content of 18 weight percent and melt index of 8 dg/min. as sold by E. I. du Pont de Nemours and Company under the tradename Elvax ® 450.
[2]Ionomer resin of the zinc cation type having a melt index of 1 gram/10 min. at 190° C. as sold by E. I. du Pont de Nemours and Company under the tradename Surlyn ® 9020.
[3]Ethylene-propylene-diene-monomer (EPDM) resin of 70 weight percent ethylene content, Mooney viscosity of 25 (ML 1 + 4 at 125° C.), and 2.5 weight percent ethylene norbornene, sold by DuPont-Dow Elastomer under the tradename Nordel ® IP 3725.

EXAMPLE 3

In this example, the same short aramid fiber material with the same moisture level as was used in Example 1 was continuously combined with ethylene vinyl acetate copolymers. In one instance, the copolymer was 51 weight percent vinyl acetate with a melt index of 2.8 grams/10 minute at 190° C. sold by Bayer AG under the tradename Levaprene® 500 (3A); and, in another instance the copolymer was 70.6 weight percent vinyl acetate with a melt index of 2.1 grams/10 minute at 190° C. sold under the tradename Levaprene® 700 (3B).

The same extruder was used as was used in Example 2. The polymers, feed rates, and other information were as follows:

| Polymer | Polymer Feed Rate (kg/hr.) | Pulp Feed Rate (kg/hr.) | Extruder Speed (rpm) |
|---|---|---|---|
| 3A | 12 | 6 | 300 |
| 3B | 12 | 6 | 300 |

EXAMPLE 4

In this example, the same extruder was used as was used in Example 2. Short aramid fiber material having different concentrations of moisture were fed at substantially constant rates.

The fiber material was poly(p-phenylene terephthalamide) pulp with an average fiber length of 1.3 millimeters, a BET surface area of 6 to 7 meters$^2$/gram, and a Canadian Standard Freeness of about 380 milliliters. It was the product sold by E. I. du Pont de Nemours and Company under the tradename Kevlar®, merge 1F538. The polymer was the same as that used in Example 1.

The fiber material was fed to the extruder using the same feeding apparatus as was used in Example 2 and the fiber material was used with three different moisture contents. Temperatures in the extruder were adjusted to be high enough to soften the polymer at introduction but low enough to keep hot water vapor from clogging the ports. The moisture content, feed rates, and other information were as follow:

| Moisture Content (wt. %) | Polymer Feed Rate (kilograms/hr.) | Pulp Feed Rate (kilograms/hr.) | Extruder Speed (rpm) |
|---|---|---|---|
| 72 | 5.6 | 6.0 | 350 |
| 35 | 16.0 | 17.0 | 350 |
| 18 | 5.0 | Discontinuous | 400 |

While the pulp having 35 and 72 weight percent water fed continuously and at a constant rate in this example, the pulp with 18 weight percent moisture was very difficult to feed to the extruder. The test of the pulp with 18 percent moisture was interrupted after about 10 minutes to break a "bridge" of fibers formed in the Hasler feeder; and in only 25 minutes after that, the extruder feeding port was entirely clogged by an accumulation of the fibers stuck to the walls of the inlet port. The port was cleaned and the test was restarted—only to be stopped again in 5 minutes by another "bridge" of fiber material.

The test, with regard to fibers having only 18 percent moisture, was discontinued.

EXAMPLE 5

In this example, the short aramid fiber material was aramid floc. Two kinds of floc were used—one was a meta-aramid, 3 millimeters in length with a diameter of 10 to 12 micrometers, and the other was a para-aramid 2 millimeters in length with a diameter of 10 to 12 micrometers. The meta-aramid floc was poly(meta-phenylene isophthalamide) as sold by E. I. du Pont de Nemours and Company under the tradename Nomex®; and the para-aramid floc was poly(paraphenylene terephthalamide) as sold by E. I. du Pont de Nemours and Company under the tradename Kevlar®. Both kinds of floc were used having 33 weight percent water.

The same extruder and fiber feeder were used in this example as were used in Example 2. The polymer was the same ethylene vinyl acetate copolymer as was used in Example 1.

The polymer and the floc were introduced to and conducted through the extruder at a rate which resulted in a composition which was 40 weight percent fiber wherein the fiber was uniformly dispersed throughout the composition. The floc, with 33 weight percent moisture, was easily fed continuously and at a constant rate. Floc at a moisture content of less than 20 weight percent, however, had a significant electrostatic charge and was difficult to feed continuously.

What is claimed is:

1. A process for continuously combining aramid fibers with an extrudable polymer to yield a substantially uniform composition comprising 15 to 99 weight percent polymer and 1 to 85 weight percent aramid fibers comprising the steps of:
   a) providing aramid fibers having a moisture content of 20 to 85 weight percent volatile liquid based on the weight of the fibers;
   b) continuously introducing the moist aramid fibers at a substantially constant rate into an extruder;
   c) applying heat to the fibers in the extruder to evaporate volatile liquid from the fibers;
   d) subjecting the heated fibers to shear forces in the extruder before introduction of the polymer;
   e) continuously introducing the polymer into the extruder downstream from introduction of the fibers;
   f) mixing the polymer and the fibers in the extruder to yield a substantially uniform composition, and
   g) expelling the composition from the extruder.

2. The process of claim 1 wherein the aramid fibers are fibrillated aramid pulp.

3. The process of claim 1 wherein the aramid fibers are aramid floc.

4. The process of claim 1 wherein the aramid is para-aramid.

5. The process of claim 1 wherein the aramid is meta-aramid.

6. The process of claim 1 wherein the fibers have a length of 0.1 to 8 millimeters.

7. A process for continuously combining aramid fibers with an extrudable polymer to yield a substantially uniform composition comprising 15 to 99 weight percent polymer and 1 to 85 weight percent aramid fibers comprising the steps of:
   a) continuously introducing aramid fibers having a moisture content of 20 to 85 weight percent volatile liquid based on the weight of the fibers, at a substantially constant rate, into an extruder;
   b) continuously introducing the polymer into the extruder downstream from introduction of the aramid fibers;
   c) mixing the polymer and the aramid fibers in the extruder to yield a substantially uniform composition, and
   d) expelling the composition from the extruder.

8. The process of claim 7 wherein the aramid fibers are fibrillated aramid pulp.

9. The process of claim 7 wherein the aramid fibers are aramid floc.

10. The process of claim 7 wherein the aramid is para-aramid.

11. The process of claim 7 wherein the aramid is meta-aramid.

12. The process of claim 7 wherein the fibers have a length of 0.1 to 8 millimeters.

* * * * *